United States Patent
Surendran et al.

(10) Patent No.: US 10,326,824 B2
(45) Date of Patent: Jun. 18, 2019

(54) METHOD AND SYSTEM FOR ITERATIVE PIPELINE

(71) Applicant: Yahoo! Inc., Sunnyvale, CA (US)

(72) Inventors: Ajitsen Surendran, Karnataka (IN); Satyadeep Sridharan Musuvathy, Karnataka (IN)

(73) Assignee: EXCALIBUR IP, LLC, Sunnyvale, CA (US)

( * ) Notice: Subject to any disclaimer, the term of this patent is extended or adjusted under 35 U.S.C. 154(b) by 0 days.

(21) Appl. No.: 14/109,169

(22) Filed: Dec. 17, 2013

(65) Prior Publication Data
US 2015/0172369 A1 Jun. 18, 2015

(51) Int. Cl.
*G06F 15/16* (2006.01)
*H04L 29/08* (2006.01)

(52) U.S. Cl.
CPC .......... *H04L 67/06* (2013.01); *H04L 67/1097* (2013.01)

(58) Field of Classification Search
CPC .................... H04L 29/08072; H04L 29/06
USPC ........................................................ 709/201
See application file for complete search history.

(56) References Cited

U.S. PATENT DOCUMENTS

| | | | | |
|---|---|---|---|---|
| 5,881,227 A * | 3/1999 | Brenner | .................. | H04L 29/06 709/200 |
| 7,418,470 B2 * | 8/2008 | Howard | .................... | G06F 8/45 706/10 |
| 7,487,206 B2 * | 2/2009 | Gu | .................... | G06F 16/90344 709/203 |
| 7,506,020 B2 * | 3/2009 | Ellis | ........................ | A01N 25/30 709/201 |
| 7,774,440 B1 * | 8/2010 | Bagrodia | ............ | H04L 41/0816 703/1 |
| 8,489,668 B2 * | 7/2013 | Huff | ....................... | H04L 12/14 709/201 |
| 8,510,366 B1 * | 8/2013 | Anderson | ............. | G06F 9/5066 709/201 |
| 9,378,053 B2 * | 6/2016 | Cai | ....................... | G06F 9/4843 |
| 2005/0080916 A1 * | 4/2005 | Katayama | ............ | H04N 21/643 709/232 |
| 2005/0246547 A1 * | 11/2005 | Oswald | ............... | H04L 63/0227 713/182 |
| 2007/0046821 A1 * | 3/2007 | Mead | ................... | H04N 19/176 348/571 |

(Continued)

OTHER PUBLICATIONS

Notice of Allowance dated Jan. 30, 2018 in U.S. Appl. No. 14/151,277.

(Continued)

*Primary Examiner* — Atta Khan
(74) *Attorney, Agent, or Firm* — Pillsbury Winthrop Shaw Pittman LLP

(57) ABSTRACT

Method, system, and programs for data processing. In one example, a record is received. The record is separated into multiple partitions. Each partition is submitted to an iterative pipeline, wherein the iterative pipeline comprises two or more processing stages that are run in parallel and one of the multiple partitions passes through one of the two or more processing stages in one iteration. The multiple partitions are passed through two or more processing stages. The partitions that have passed through each of the two or more processing stages are merged.

10 Claims, 17 Drawing Sheets

(56) References Cited

U.S. PATENT DOCUMENTS

| | | | | |
|---|---|---|---|---|
| 2007/0279667 | A1* | 12/2007 | Hattori | H04N 1/32561 |
| | | | | 358/1.13 |
| 2008/0313011 | A1* | 12/2008 | Rose | G06Q 30/02 |
| | | | | 705/7.32 |
| 2009/0125563 | A1 | 5/2009 | Wong | |
| 2011/0010674 | A1* | 1/2011 | Knize | G01C 21/20 |
| | | | | 715/849 |
| 2012/0200580 | A1* | 8/2012 | Gnanasambandam | G06T 1/20 |
| | | | | 345/505 |
| 2012/0297238 | A1* | 11/2012 | Watson | G06F 9/5088 |
| | | | | 714/4.11 |
| 2012/0314653 | A1 | 12/2012 | Liu | |
| 2013/0104177 | A1* | 4/2013 | Kwan | H04N 21/234 |
| | | | | 725/93 |
| 2013/0111484 | A1 | 5/2013 | Chen | |
| 2013/0212603 | A1* | 8/2013 | Cooke | G06F 9/542 |
| | | | | 719/328 |
| 2015/0071346 | A1* | 3/2015 | Ronca | H04N 19/124 |
| | | | | 375/240.03 |

OTHER PUBLICATIONS

Office Action dated Jul. 28, 2017 in U.S. Appl. No. 14/151,277.
Office Action dated Apr. 15, 2016 in U.S. Appl. No. 14/151,277.

\* cited by examiner

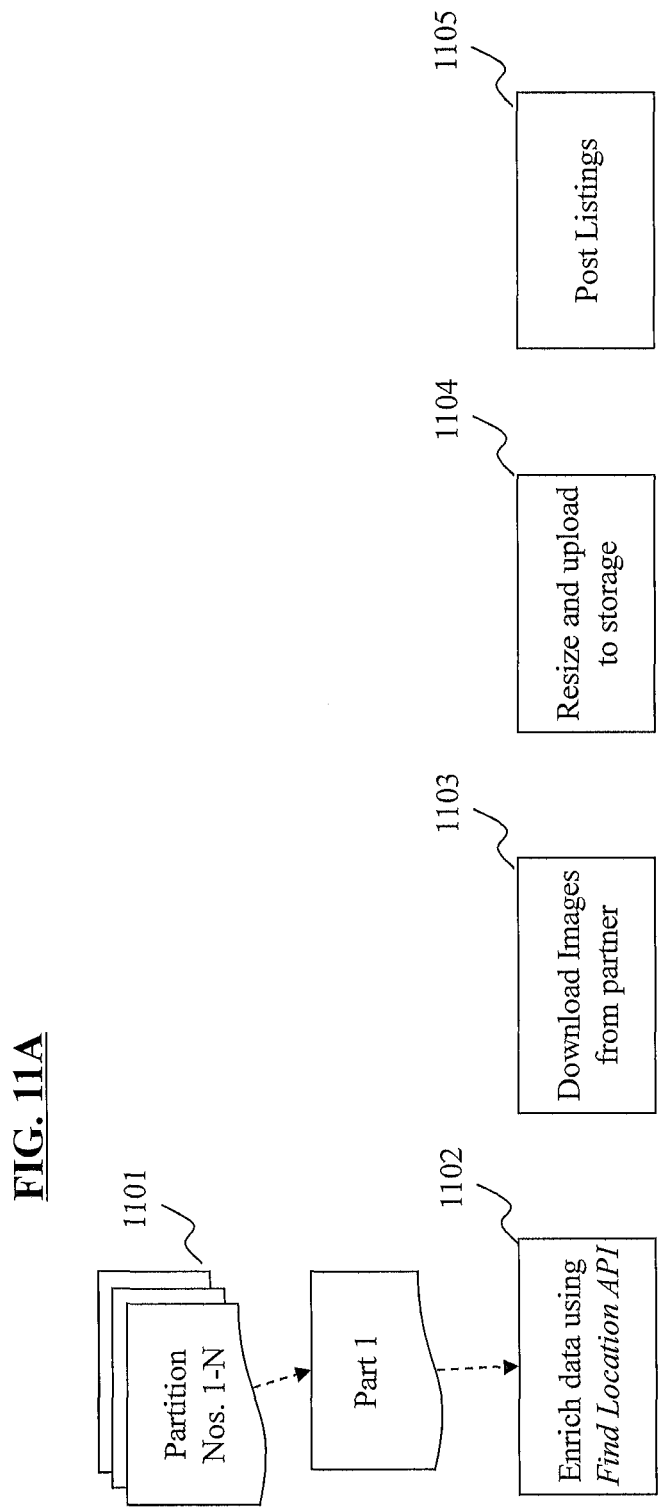

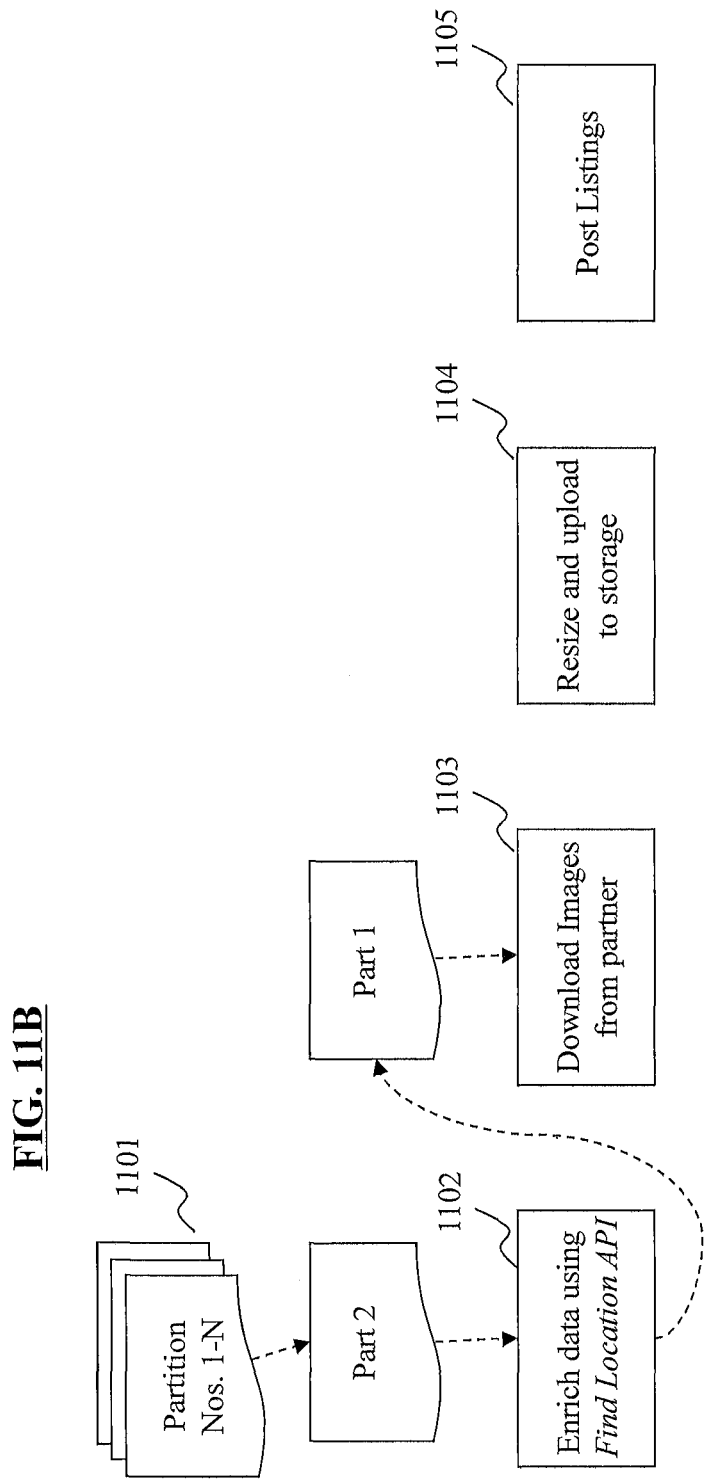

METHOD AND SYSTEM FOR ITERATIVE PIPELINE

BACKGROUND

Technical Field

The present teaching relates to methods and systems for data processing. Particularly, the present teaching is directed to methods, systems, and programming to maximize throughput of processing jobs.

Discussion of Technical Background

The advancement of the Internet has made it possible to make a tremendous amount of information accessible to users located anywhere in the world. It is estimated that hundreds of exabytes of information is stored in digital form. Content providers, such as businesses, government agencies, and individuals, generate large amounts of both structured and unstructured data which, in order to be accessible online, must be processed, analyzed, and stored. With the explosion of information, new issues have arisen. First, much effort has been put into organizing the vast amount of information to facilitate the search for information in a more effective and systematic manner. Due to the large volume of content that is presently available and is continually generated, traditional data computing techniques are inadequate to facilitate processing large volumes of data that may be terabytes or petabytes in size.

A number of large scale data processing and analysis tools have been developed to process large volumes of information. Many of these tools make use of cloud computing, which involves a number of computers connected through a real-time communication network, such as the Internet. Cloud computing allows computational jobs to be distributed over a network and allows a program to be concurrently run on many connected computers. The network resources may be shared by multiple users or may be dynamically re-allocated to accommodate network demand. As such, cloud computing solutions are often designed to maximize the computing power of the network and the efficiency of the network devices. This distributed processing configuration allows an entity to avoid upfront infrastructure costs associated with computing equipment.

Apache Hadoop (Highly Available Distributed Object Oriented Platform) is a Java-based programming framework and one of the most popular large scale data processing and analysis tools presently available, Hadoop Distributed File System, is a distributed file system designed to hold terabytes or even petabytes of data and provide high-throughput access to this information. Files are stored in a redundant fashion across multiple machines to ensure their durability to failure and high availability to very parallel applications. Google's MapReduce is another programming model for processing large scale data sets that makes use of a parallel, distributed algorithm. Hadoop is an open source implementation of the MapReduce platform and distributed file system.

Existing large scale data processing and analysis tools offer users scalable, reliable services that are easy to use. For example, Yahoo! offers its users a large scale partner feed processing system that interfaces with various hosted services for enrichment of partner feeds. These hosted services typically provision a limited quota of its resources to a new user during on-boarding and the number of machines involved depends on input size and cluster size. However, present technologies, including cloud services, may be overloaded by large-scale processing jobs. There is a need adequately control and maximize throughput of network intensive processing jobs.

There is presently no solution which makes adequate use of increasing throughput of processing jobs by concurrent utilization of multiple network resources. Within a large scale data processing platform, processing data from partner feeds relies heavily on resources provided by cloud based systems. Not only do cloud based systems provide necessary storage, but the systems may enrich processed data with, by way of example, geographic information, context analysis, or license management information. Processing tasks are provisioned among resources available on the network. In many cloud based systems, the allocation of resources to a particular user or job is done based, in part, on peak usage. For example, in case of Hadoop-based feed processing, peak usage is determined by input feed size. However, one drawback to provisioning is the high cost associated with the necessary dedicated hardware. In addition, the sequential processing of data by multiple services in existing data processing systems is inherently limited in that only one service at a time may be utilized. For example, while running a processing stage for enriching data, it is not possible to utilize services upload data to an ingestion buffer or content grid. In addition, large input size will cause existing data processing systems to generate a large number of map tasks, which can overload the entire system.

Although cloud based systems allow for large scale data processing to be distributed across multiple machines in a network, cloud services are largely underutilized when provisioned for daily peak capacity. By way of example, a client may overload cloud services beyond the allocated quota, resulting in underperformance or outage of the services. Overload poses a systemic risk to cloud services and there has been significant investment in overload protection for these services. Although resource intensive processing jobs pose serious risk of system overload, processing systems may remain largely unused the majority of the time they are online. For example, a batch processing system may be utilized for a period of less than three hours per day at an image upload rate of 360 uploads per second, yet the cloud provisioning done to handle this rate of request could remain unused for rest of the day. One option to reduce the amount of network resources required would involve limiting the rate at which upload requests are made such that the system is utilized for a longer time period. However, no existing solutions provides achieve this goal without adjusting or otherwise relying on input feed size.

The use large scale data processing platforms to process network intensive jobs poses a number of challenges. For example, these solutions may over provision the cloud service, due to scalability issues. By way of further example, a drastic increase in data input size could cause overload on the service, resulting in slowed performance speeds or outages. In addition, processing network intensive jobs may result in considerable waste of cluster capacity as the rate of processing will be limited by the network service. These factors, among others, affect the overall throughput and number of records processed per second by the platform. As many large scale data processing platforms are not optimized for such processing, a solution is needed that would allow existing platforms to perform network intensive processing jobs.

In addition, a solution is needed that would control the rate at which requests are made to particular processing services, while maximizing overall throughput. Existing solutions for controlling request rates to achieve high throughput include establishing a set number of reduce nodes and performing all network operations in a single reduce phase. However, existing reduce based solutions suffer from several drawbacks. For example, in the event that a web service does not accept batch requests, reduce based solutions must to allocate large number of reduce nodes, each of which must wait until all map tasks have been completed, resulting in underutilization of grid nodes. Further, reduce based solutions require additional data transfer from Map Nodes to Reduce Nodes. Existing solutions may also require overload protection services and implement error handling, such as exponential back-off in map process, resulting in inefficiency and high cost throughput.

SUMMARY

The present teaching relates to methods and systems for data processing. Particularly, the present teaching is directed to methods, systems, and programming for processing data using an iterative pipelining approach.

In an embodiment, a method, implemented on at least one computing device having at least one processor, storage, and a communication platform connected to a network for retrieving content on a network, such as the World Wide Web, is disclosed. In this embodiment, a record is received. The record is separated into multiple partitions. Each partition is submitted to an iterative pipeline, wherein the iterative pipeline comprises two or more processing stages that are run in parallel and one of the multiple partitions passes through one of the two or more processing stages in one iteration. The multiple partitions are passed through two or more processing stages. The partitions that have passed through each of the two or more processing stages are merged.

In another embodiment, a system for implementing a computer implemented method is disclosed. This embodiment comprises at least one processor, storage, and a communication platform connected to a network, a data partitioning unit, and an iterative pipeline. The data partitioning unit is configured for separating a record received by the at least one processor into multiple partitions. The iterative pipeline comprises two or more processing stages that run in parallel and one of the multiple partitions passes through one of the two or more processing stages in one iteration. The at least one processor is configured for submitting each partition to the iterative pipeline and concurrently passing two or more of the multiple partitions through two or more of the processing stages.

Other concepts relate to software for implementing the present invention. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc. Other embodiments of the present invention are equally applicable to any remote service which includes property hosted web services or data base applications.

In another embodiment, a machine-readable tangible and non-transitory medium having information recorded thereon for processing data is disclosed. The information, when read by the machine, causes the machine to receive a record, separate the record into multiple partitions, submit each partition to an iterative pipeline, wherein the iterative pipeline comprises two or more processing stages that run in parallel and one of the multiple partitions passes through one of the two or more processing stages in one iteration, and concurrently pass two or more of the multiple partitions through two or more of the processing stages.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 11A-11D depict the workflow of partitions through the iterative processing stages;

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching relates to processing electronic information. One embodiment of the present teaching relates to receiving a record for processing. The record is separated into multiple partitions. The record may be separated into multiple partitions based on the capacity of a network application programming interface or based on the capacity of one or more cloud services. The size of the record may also determine a number of map tasks that are to be performed on the partitions. Each partition is submitted to an iterative pipeline, wherein the iterative pipeline comprises two or more processing stages that are run in parallel and one of the multiple partitions passes through one of the two or more processing stages in one iteration. The processing stages may include a stage that enriches the data of the partition. The processing stages may include a stage that downloads data. The processing stages may include a stage that uploads data to storage. The processing stages may include a stage that posts listings. The processing stages may be cloud services or processing capabilities available on remote machines or distributed across a network of devices. The multiple partitions are passed through two or more processing stages. The multiple partitions in the iterative pipeline may be passed through the processing stages concurrently or in an established sequence. Each iteration may involve a partition passing through one processing stage as a separate partition passes through a separate processing stage. The partitions that have passed through each of the two or more processing stages are merged.

Figure 1:
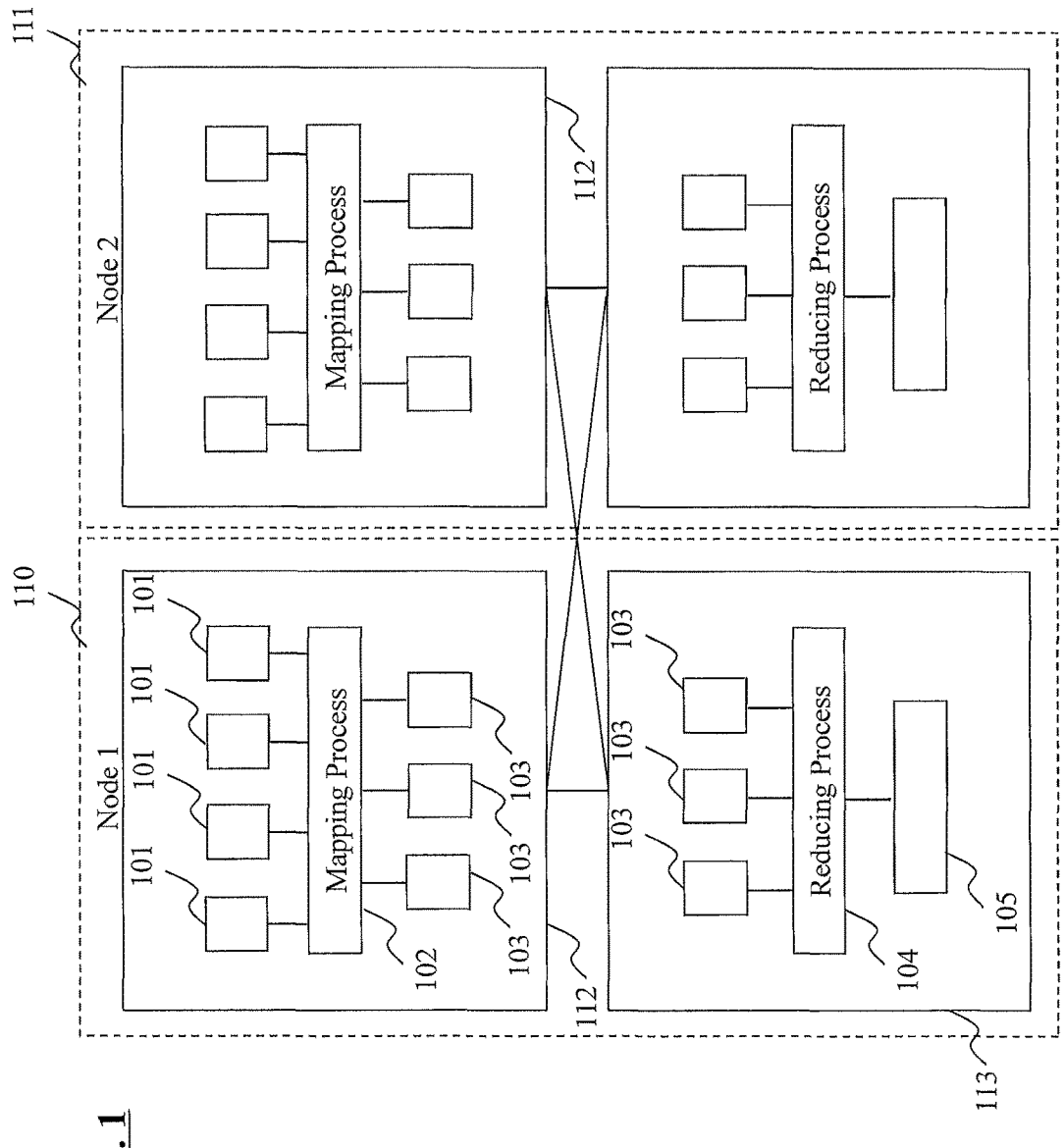
FIG. 1 depicts a high-level overview of a MapReduce pipeline.

Whereas the present teaching may be implemented in nearly any platform for large scale data processing, one embodiment of the present teaching is implemented by the Hadoop batch processing system, which is an open source implementation of the MapReduce platform and distributed file system. An example of a high level diagram of a MapReduce pipeline is depicted in FIG. 1. MapReduce is a programming model designed for processing large volumes of data by dividing the project into multiple, independent tasks. The first phase of a typical MapReduce program is known as mapping, which creates an output list by applying a function to individual elements of an input list. The second phase of a typical MapReduce program is known as reducing, which provides the ability to aggregate multiple input values to produce an aggregate value as an output. Reducing is commonly used to generate summary data by converting a large volume of data into a smaller summary of the data, such as a sum of a list of input values. Hadoop utilizes a MapReduce framework with two main components: one that implements a mapping function 102 and the other that implements a reducing function 104. Input files 101 are loaded onto a processing cluster and distributed across nodes 110, 111. Whereas FIG. 1 depicts two nodes 110, 111, a system may contain any number of nodes. During the mapping phase 112, input files 101 are submitted to the mapping process 102 and intermediate data 103 is output. After the mapping phase 112 has finished, the intermediate data 103 is exchanged between all machines or processing elements in each node 110, 111 and the reduce tasks are spread across the same notes in the cluster as the mapping processes. The intermediate data 103 is then sent to the reducing phase 113 where it is subject to a reducing process 104 that generates the outputs 105 of the reduce phase.

Figure 2:
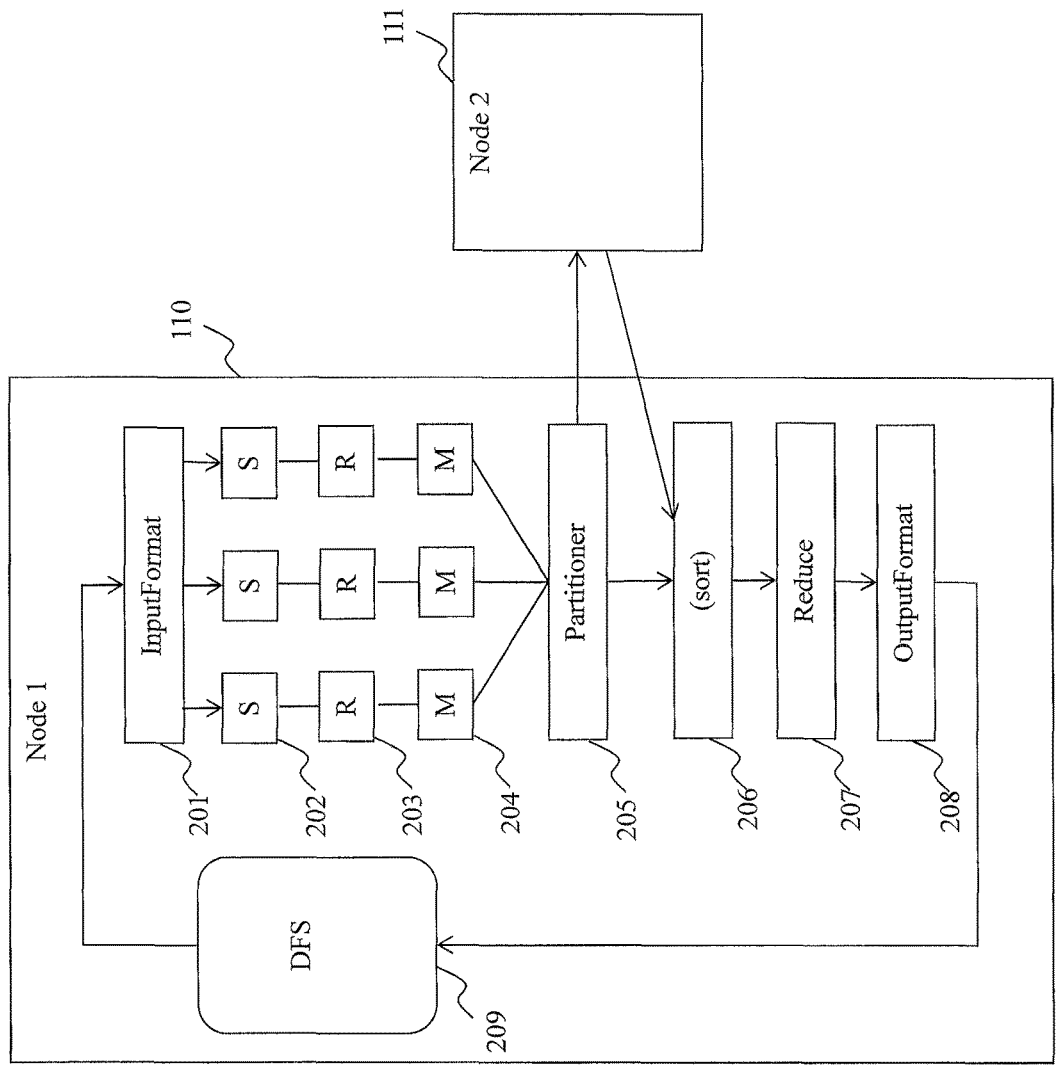
FIG. 2 depicts a typical MapReduce data flow.

A more detailed example of data flow in a typical MapReduce that may be implemented by one embodiment of the present teaching is depicted in FIG. 2. Within a node, 110, a program 201 partitions input files into logical byte-oriented splits 113 (identified in FIG. 2 with an "S"), each of which specify file name, offset, length and set of nodes that host most of the split. FIG. 2 identifies InputFormat 201 as the program in this example. For most systems, the total number of map tasks 204 (identified in FIG. 2 with an "M") is equal to the number of splits returned by InputFormat, which could be greater than the number of concurrently running map tasks 204. Record readers 203 (identified in FIG. 2 with an "R") read the splits and sequentially pass each record, one at a time, to the map task 204 as key value pairs. Often times, processing requires multiple map reduce jobs. In some circumstances, work flow language may allow users to stitch multiple map-reduce jobs together, wherein the work flow supports control nodes such as decision, fork, and join. A fork node splits one path of execution into multiple concurrent paths of execution. A join node waits until each concurrent execution path of a previous fork node arrives. The map tasks 204 perform the work of the first phase 112 of the MapReduce program. After the first map tasks 204 have completed in one node, other nodes may still be performing map tasks. Intermediate outputs are passed to a partitioner class 205, from which the nodes 110 and 111 begin exchanging the intermediate outputs from the map tasks to reducers, a process sometimes referred to as "shuffling". A different subset of the intermediate key space is assigned to each reduce node and serve as the inputs to the reduce tasks. Each map task may emit key-value pairs to any partition, wherein all values for the same key are reduced together, irrespective of its mapper of origin. Because the map nodes must all agree on where to send the different pieces of the intermediate data, the partitioner class 205 determines to which partition a given key-value pair will be sent. The set of intermediate keys on a single node is automatically sorted 206 before being passed to a reduce instance 207 where each reducer 207 instance is created for a reduce task. For each key in the partition assigned to a reducer 207, the reduce method is called once. The output files written by the reducers 207 are then stored in a distributed file system 209 for subsequent use by another map reduce job, separate program, other form of inspection, or further manipulation.

Figure 3:
FIG. 3 depicts a data processing workflow according to an embodiment of the present teaching.

FIG. 3 depicts a data processing workflow according to an embodiment of the present teaching. In the first step of this embodiment, an input file is received 301. The input file may comprise data, feed files, other electronic files, information, or some other form of electronic record. The received input file proceeds to a partition phase, 302, which separates the input file into partitions or chunks of a configured size. In one embodiment, the size of the input file determines the number of map tasks to be performed. In one embodiment, the number of concurrent maps determine a request rate. The partitions are sequentially passed along to a concurrent processing stage one 303, a concurrent processing stage two 304, a concurrent processing stage three 305, and a concurrent processing stage four 306. Although four concurrent processing stages are depicted in FIG. 3, the number of concurrent processing stages will vary across embodiments of the present invention. In this embodiment, the workflow semantics of the system support iteration, such that one partition is passing through one of the concurrent processing stages as another partition is concurrently passing through a separate processing stage. After concurrent processing stage four 306, processed partitions are merged 307. In one embodiment, the processing stages are run concurrently and the workflow waits to complete all parallel stages before the processed partitions are merged.

Figure 4:
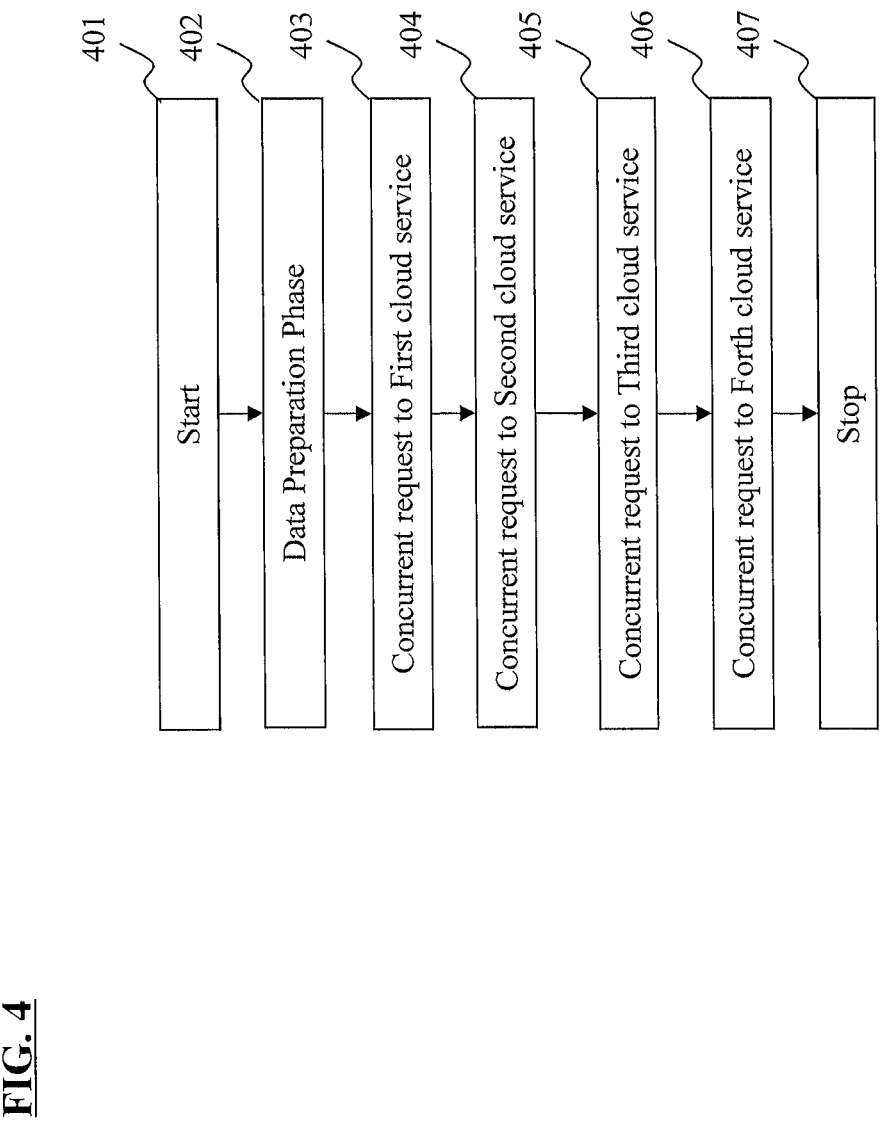
FIG. 4 depicts a bulk data processing workflow that depends on cloud services according to an embodiment of the present teaching.

FIG. 4 depicts a bulk data processing workflow that depends on cloud services according to an embodiment of the present teaching. In this embodiment the workflow is initiated with a start 401 command or request to process a given record. The record then proceeds to a data preparation phase 402 that performs preprocessing and prepares the record for submission to a series of cloud services. In one embodiment, the record is partitioned or separated into a number of smaller files, data sets, records, partitions, or other units. This may be done based, in total or in part, on the present or future capacity of the cloud services or the entire network. Subsequently, requests are made to a series of cloud services 403, 404, 405, and 406 for processing the objects from the data preparation phase 402. The resulting objects are passed to the cloud services, which run concurrently and receive each object in sequence according to one embodiment of the present teaching. Although four concurrent processing stages are depicted in FIG. 4, the number of concurrent processing stages will vary across embodiments of the present invention. In one embodiment, the workflow semantics of the system support iteration, such that one object is passing through one of the could services as another partition is concurrently passing through a separate cloud service. In one embodiment, the cloud services 403, 404, 405, and 406 are configured to run as an iterative pipeline in which objects are concurrently processed by the cloud services in sequence. The workflow reaches a stop 407 once the record or each of its component objects has been processed by the cloud services.

Figure 5:
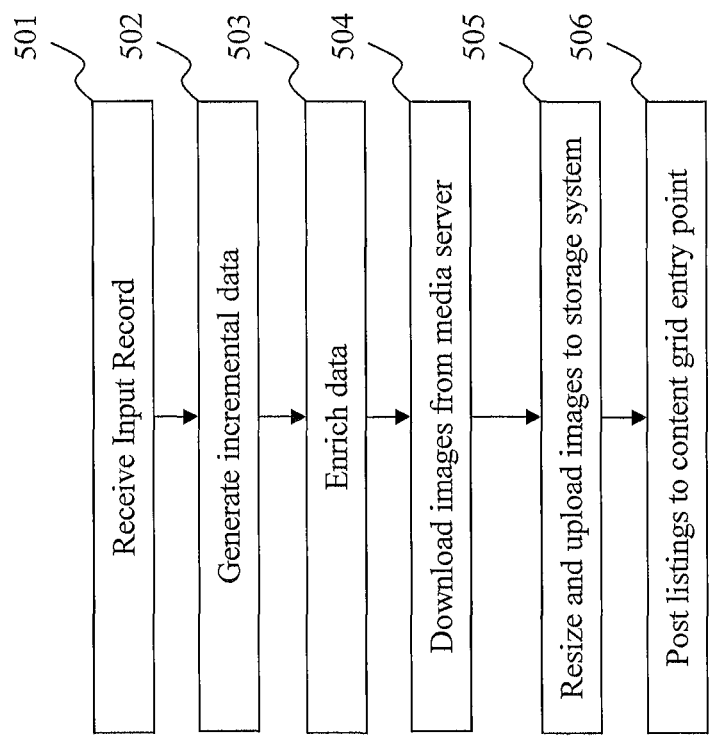
FIG. 5 depicts one embodiment of a data processing workflow according to an embodiment of the present teaching.

FIG. 5 depicts one embodiment of a data processing workflow according to an embodiment of the present teaching. In the first step of this embodiment, an input record is received 501. The input record may comprise data, feed files, other electronic files, information, or some other form of electronic record. The processing system generated incremental data 502 from the received input record. In one embodiment, the size of the incremental data is configured based on the size of the input record. In one embodiment the size of the input record or the size of the incremental data determines the number of subsequent processes to be performed. In on embodiment, the number of concurrent processes determine a request rate. In one embodiment, the incremental data is processed in a series of stages. In one embodiment these stages include: a stage that enriches the incremental data 503, which may include a find location application programming interface or other form of geo location information; a stage that downloads images from a media server 504; a stage that resizes the images and uploads the images to a storage system 505; and a stage that posts listings to a content grid entry point 506. In one embodiment, each of these stages is performed by a separate cloud service. The processing stages 503, 504, 505, and 506 may be run as an iterative pipeline in which all stages run concurrently as each incremental data object is passed through the stages in sequence. Although four concurrent processing stages are depicted in FIG. 5, the number of concurrent processing stages will vary across embodiments of the present invention. In this embodiment, the workflow semantics of the system support iteration, such that one partition is passing through one of the concurrent processing stages as another partition is concurrently passing through a separate processing stage.

Figure 6:
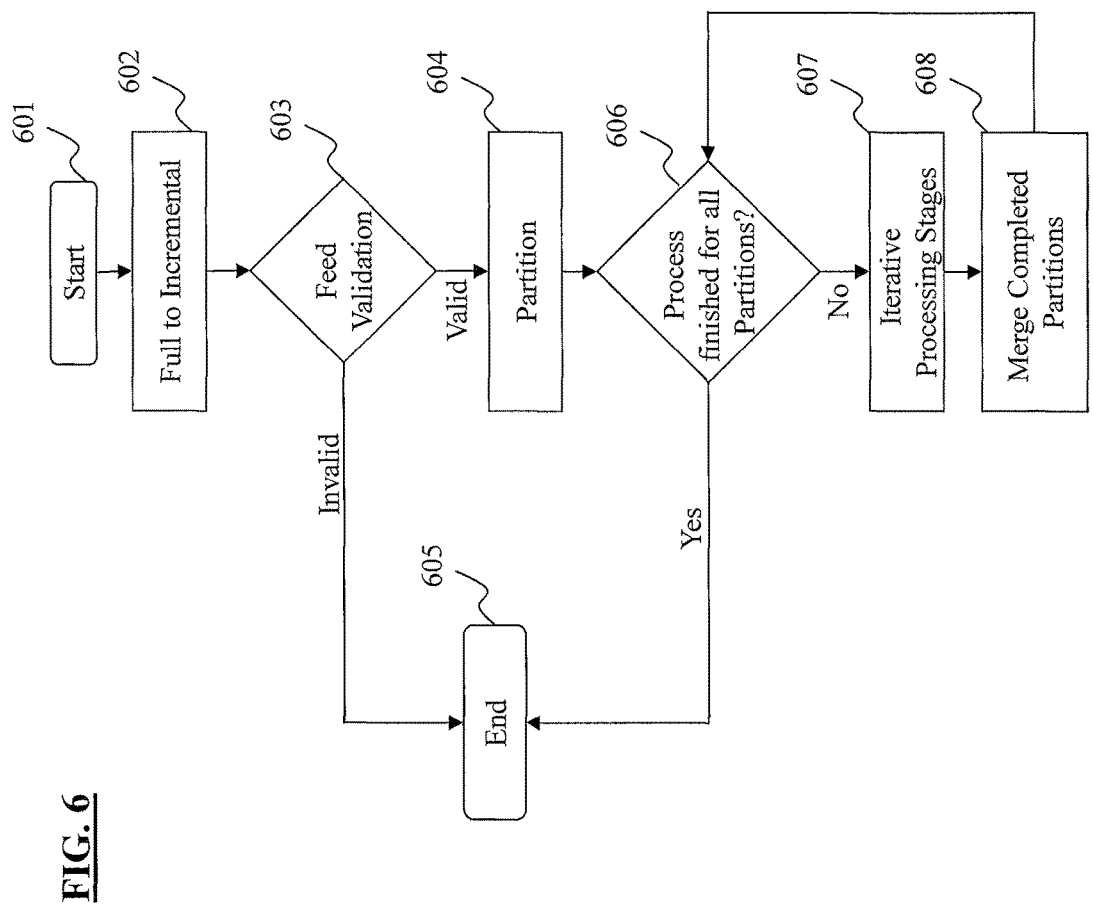
FIG. 6 depicts an exemplary overview of iterative pipelining workflow according to an embodiment of the present teaching.

FIG. 6 depicts an exemplary overview of iterative pipelining workflow according to an embodiment of the present teaching. In this embodiment, a record is received or identified for processing at the start stage 601. The record passes through a full to increment stage 602, which generates incremental data from the record. The record may comprise a data structure, feed files, other electronic files, information, or some other form of electronic record. The incremental data is passed through a feed validation stage 603. If the feed is invalid, the entire process is terminated 605. If the feed is valid, the incremental data is partitioned into chunks of a configured size 604. In one embodiment, the size of the input file determines the number of map tasks to be performed. In one embodiment, the number of concurrent maps determine a request rate. The system then determines whether all partitions have been processed 606. To the extent partitions remain to be processed, these partitions are passed into a series of iterative processing stages 607. In one embodiment of the present teaching, these stages concurrently process the partitions in a series of iterations until each partition has been processed by each stage. In one embodiment, the iterative processing stages are performed by cloud services and the workflow semantics of the system are configured such that one object is passing through one of the could services as another partition is concurrently passing through a separate cloud service. Completed partitions are merged 608 after having been run through the iterative processing stages 607. In one embodiment, the partitions are merged as they complete the iterative processing stages 607. In another embodiment, all partitions are run through the iterative processing stages before being merged 608. Once the system determines that all partitions have completed the iterative processing stages 607 and the completed partitions have been merged 608, the system terminates the processing of that record 605.

Figure 7:
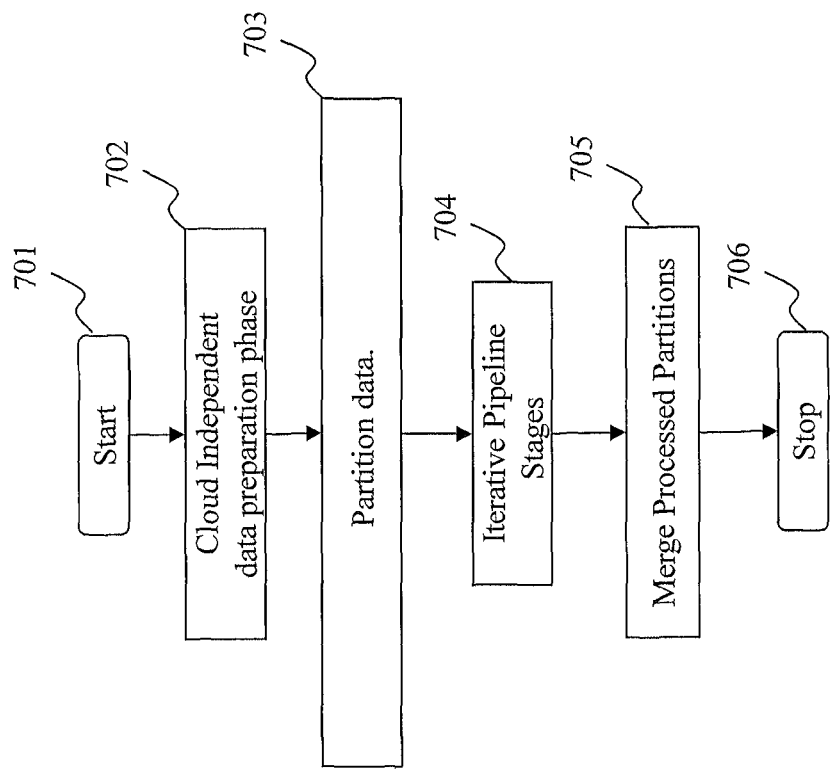
FIG. 7 depicts an exemplary overview of a data processing workflow according to an embodiment of the present teaching.

FIG. 7 depicts an exemplary overview of a data processing workflow according to an embodiment of the present teaching. In this embodiment, a record is received or identified for processing at the start stage 701. The record is subject to a cloud independent data preparation phase 702, during which the record may be modified, enhanced, enriched, or subject to preliminary processing. The record is then separated into partitions during a partition data stage 703. In one embodiment, the data is partitioned according to capacity of cloud services. In one embodiment, the size of the input file determines the number of map tasks to be performed. In one embodiment, the number of concurrent maps determine a request rate. The data partitions are passed along to iterative pipeline stages 704 for processing. The iterative pipeline stages 704 may include any number of individual stages. In one embodiment, each processing stage is performed by a separate cloud service. Processed partitions are passed from the iterative pipeline stages 704 to a merge processed partitions stage 705 and the iterative processing of the partitions is completed 706.

Figure 8:
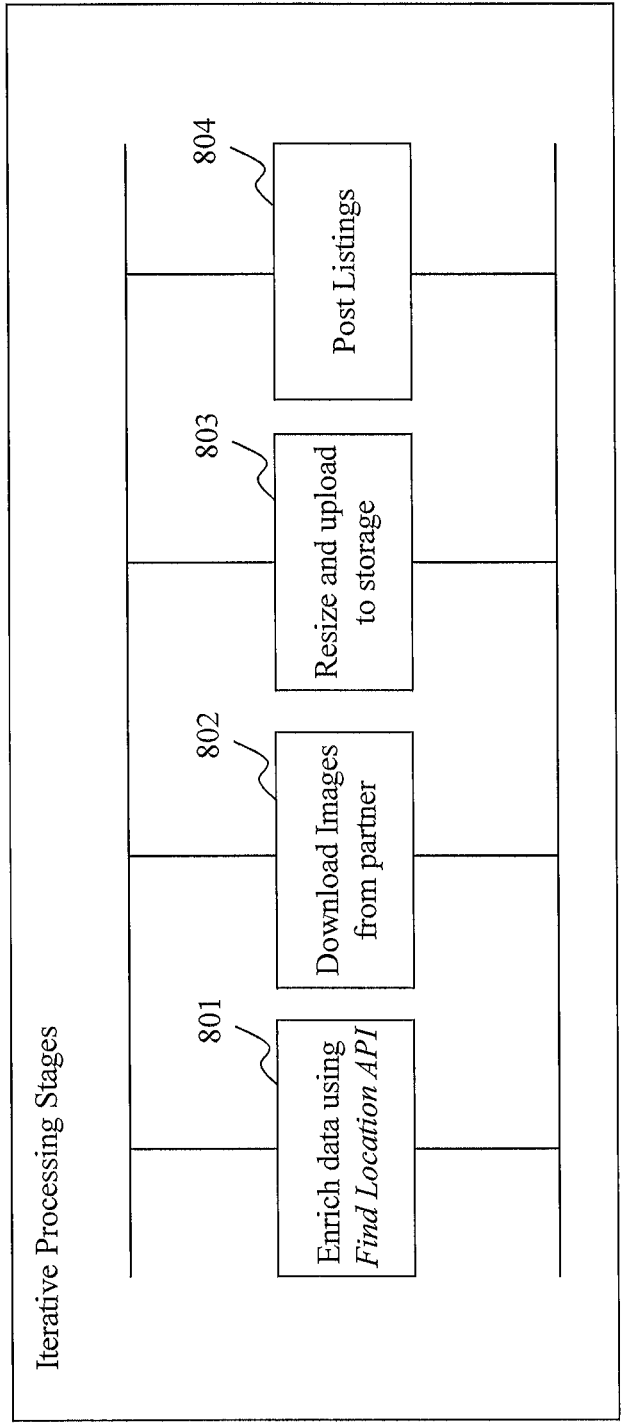
FIG. 8 depicts the iterative processing stages according to an embodiment of the present teaching.

FIG. 8 depicts the iterative processing stages according to an embodiment of the present teaching. In one embodiment these stages are run in parallel. In one embodiment, the stages are run concurrently and the workflow waits to complete all parallel stages. In one embodiment the iterative pipeline comprises four stages, however, other embodiments may include greater or fewer stages and it is contemplated that the pipeline may comprise stages other than those disclosed in this embodiment. In the embodiment depicted in FIG. 8, the iterative pipeline comprises an enrich data stage using a find location interface 801, a stage during which images are downloaded from a partner feed 802, a stage that resizes and uploads images to storage 803, and a stage that posts the corresponding listings 804, which is unaffected by the partitioning of the input data.

Figure 9:
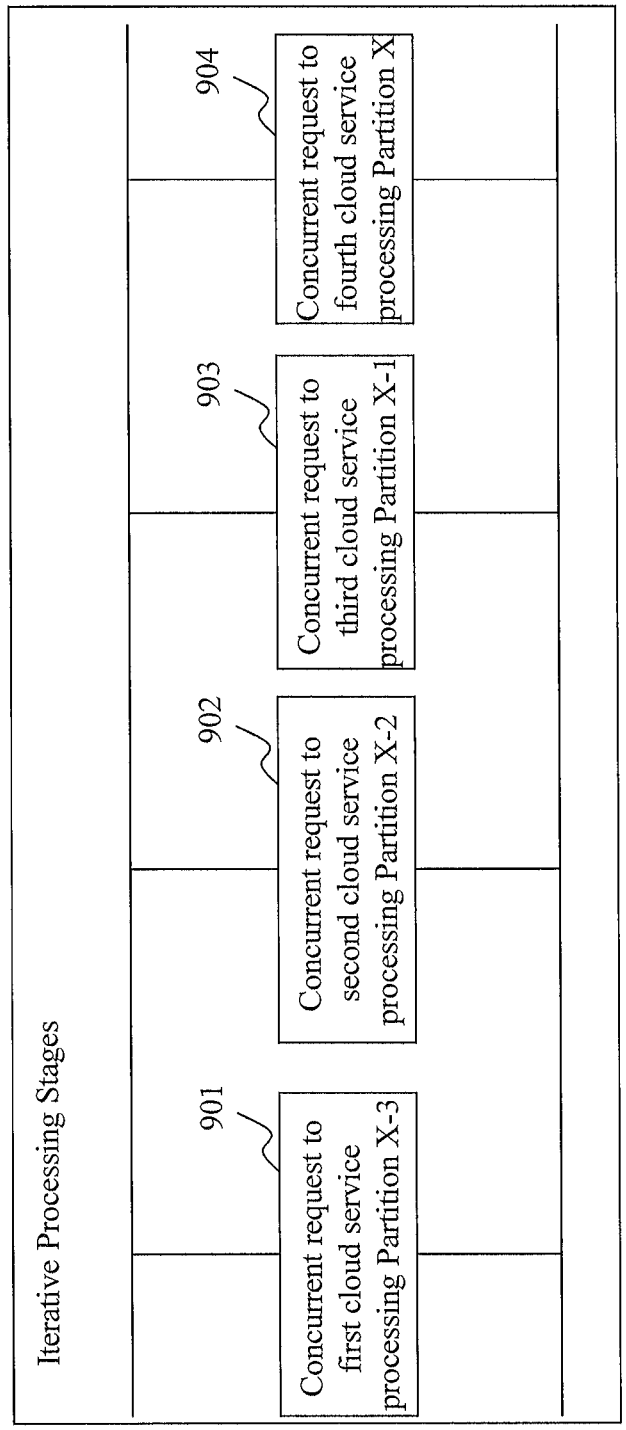
FIG. 9 depicts the iterative processing stages performed by cloud services according to an embodiment of the present teaching

FIG. 9 depicts the iterative processing stages performed by cloud services according to an embodiment of the present teaching. In one embodiment, the stages are run concurrently and the workflow waits to complete all parallel stages. In one embodiment the iterative pipeline comprises four stages, however, other embodiments may include greater or fewer stages and it is contemplated that the pipeline may comprise stages other than those disclosed in this embodiment. In the embodiment depicted in FIG. 9, the iterative pipeline comprises a series of concurrent requests to a set of cloud services processing the partitioned data 901, 902, 903, and 904.

Figure 10:
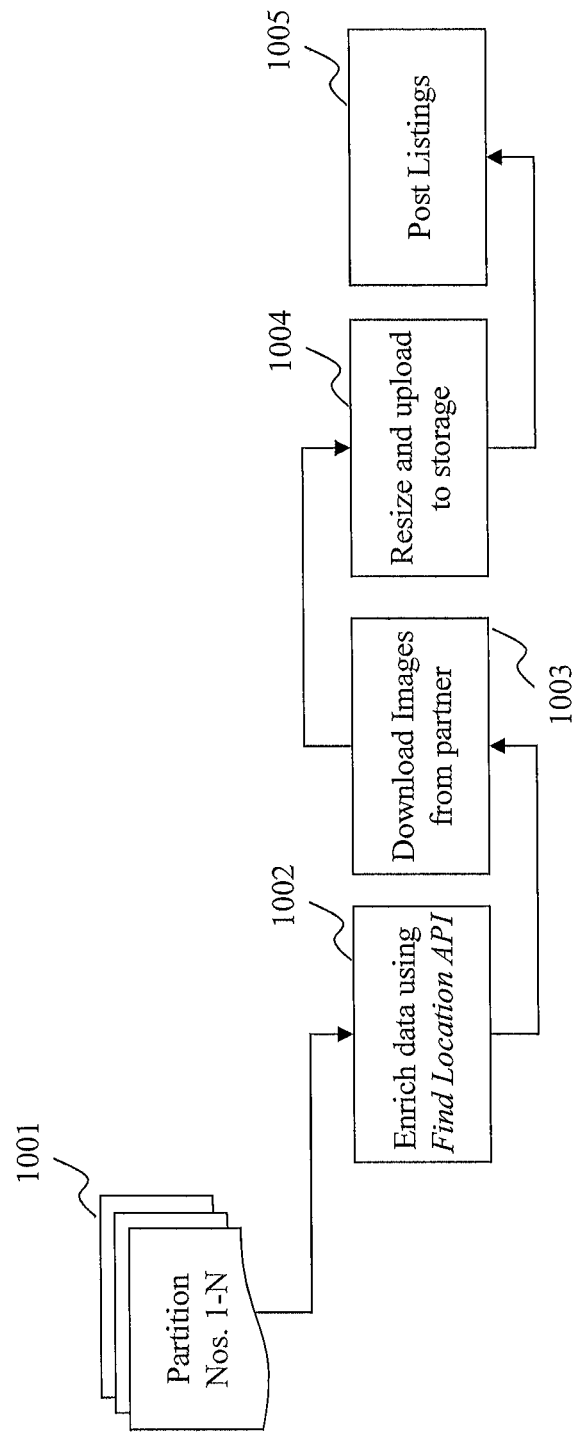
FIG. 10 depicts the iterative processing stages according to an embodiment of the present teaching.
Figure 11C:
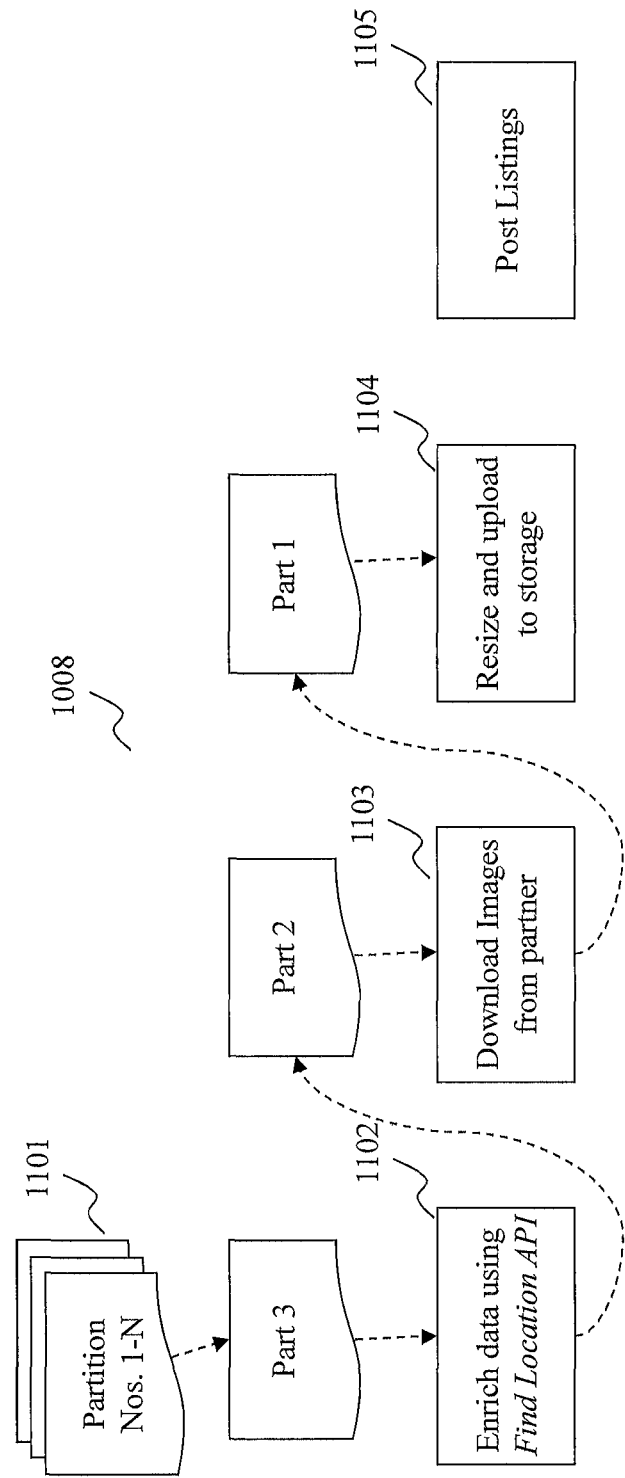
Figure 11D:
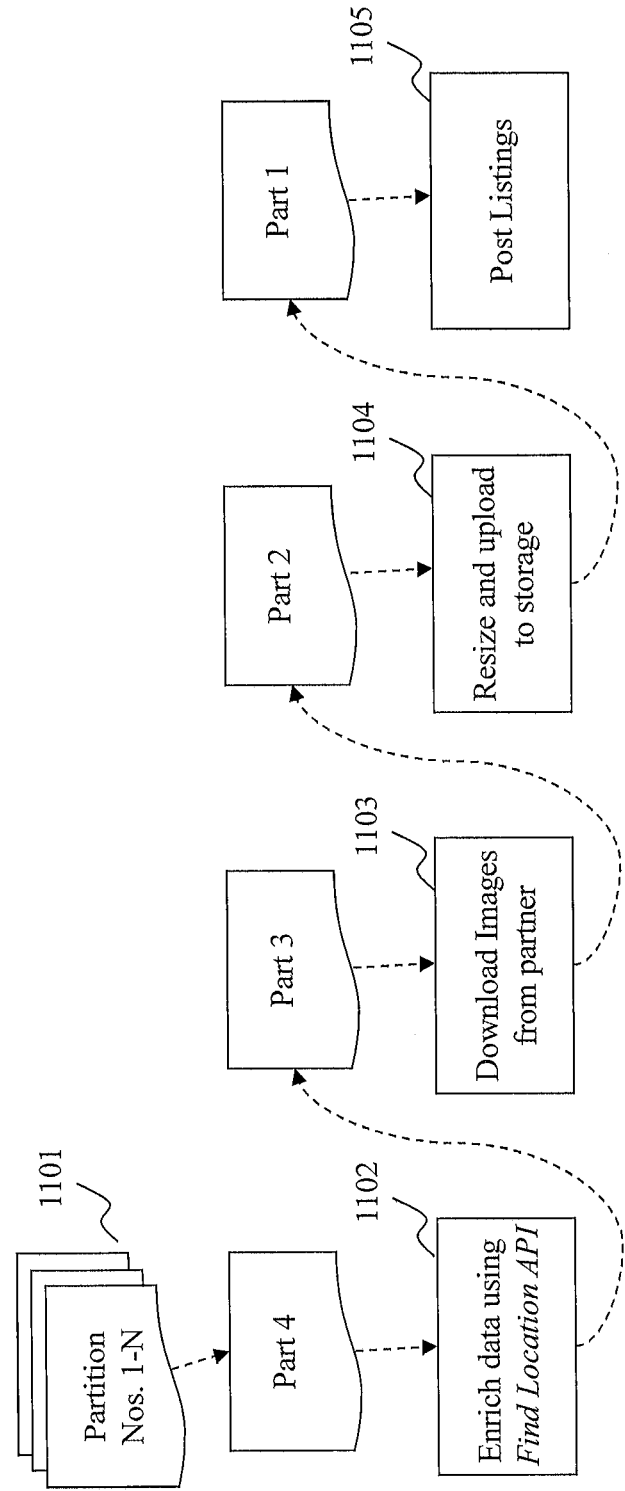

FIG. 10 depicts the iterative processing stages according to an embodiment of the present teaching. In this embodiment, a record has been separated into N partitions and each partition, 1-N, is passed through the iterative pipeline. Namely, each partition 1 through partition N 1001 are passed through each of the following stages sequentially: an enrich data stage 1002, a download images from partner stage 1002, a resize and upload to storage stage 1004, and a post listings stage 1005. In one embodiment, each partition is processed by each stage in one iteration.

FIGS. 11A-11D depict the workflow of partitions through the iterative processing stages. In this embodiment, a record has been separated into N partitions and each partition, 1-N, is passed through the iterative pipeline. In the first iteration, depicted in FIG. 11A, the first partition, Part1 is sent through the find location stage 1102. In the second iteration, depicted in FIG. 11B, Part2 flows through find location stage 1102 while Part1 becomes input for the image download stage 1103. In the third iteration, depicted in FIG. 11C, Part3 flows through the find location stage 1102, Part2 becomes the input for the image download stage 1103, and Part1 becomes the input for the resize and upload to storage stage 1104. In the fourth iteration, depicted in FIG. 11D, Part4 is sent through the find location stage 1102, Part3 becomes input for the image download stage 1103, Part 2 is passed to the resize and upload to storage stage 1104, and Part 1 reaches the final stage of the iterative pipeline according to this embodiment, post listings 1105.

Figure 12:
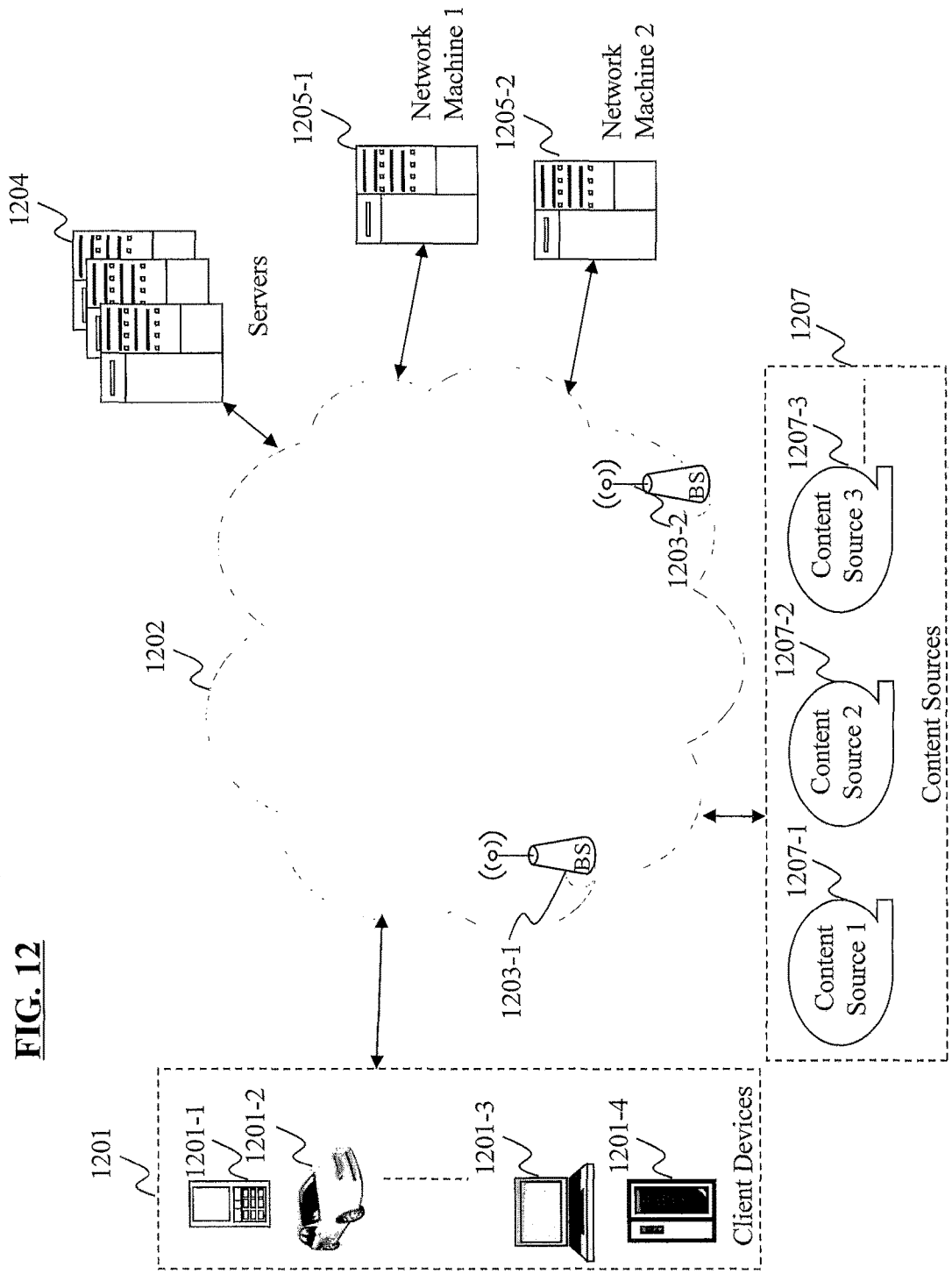
FIG. 12 depicts a general network architecture on which the present teaching can be implemented.

FIG. 12 is a high level depiction of an exemplary networked environment in which an exemplary embodiment of the present teaching may be implemented. The exemplary system includes client devices 1201, a network 1202, multiple servers 1204, Network Machines 1205-1 and 1205-2, and Content Sources 507. The network 1202 can be a single network or a combination of different networks. For example, a network can be a local area network (LAN), a wide area network (WAN), a public network, a private network, a proprietary network, a Public Telephone Switched Network (PSTN), the Internet, a wireless network, a virtual network, or any combination thereof. A network may also include various network access points, e.g., wired or wireless access points such as base stations or Internet exchange points 1203-1, . . . , 1203-2, through which a data source may connect to the network in order to transmit information via the network. Users 1201 may be of different types such as users connected to the network via desktop connections (1201-4), users connecting to the network via wireless connections such as through a laptop (1201-3), a handheld device (1201-1), or a built-in device in a motor vehicle (1201-2). The content sources 1207 may include multiple content sources 1207-1, 1207-2, 1207-3. A content source may correspond to a web page host or general data structure corresponding to an entity, whether an individual, a business, or an organization such as USPTO.gov, a content provider such as cnn.com and Yahoo.com, or a content feed source such as Twitter or blogs. The servers 1204 may access information from any of the content sources 1207-1, 1207-2, . . . , 1207-3. The servers may access or provide information regarding existing objects, or to classify new or existing entities as objects within the system. The servers 1204 may also direct requests, calls, initiate other tasks or receive information from the network machines 1205, which may be used to perform clout services. The servers 1204 may also access additional information, via the network 1202, stored in the network, which may contain, e.g., structured information such as information about certain objects, identifiers assigned to objects, graphs of entities based on their content, events that link different objects together, etc.

Figure 13:
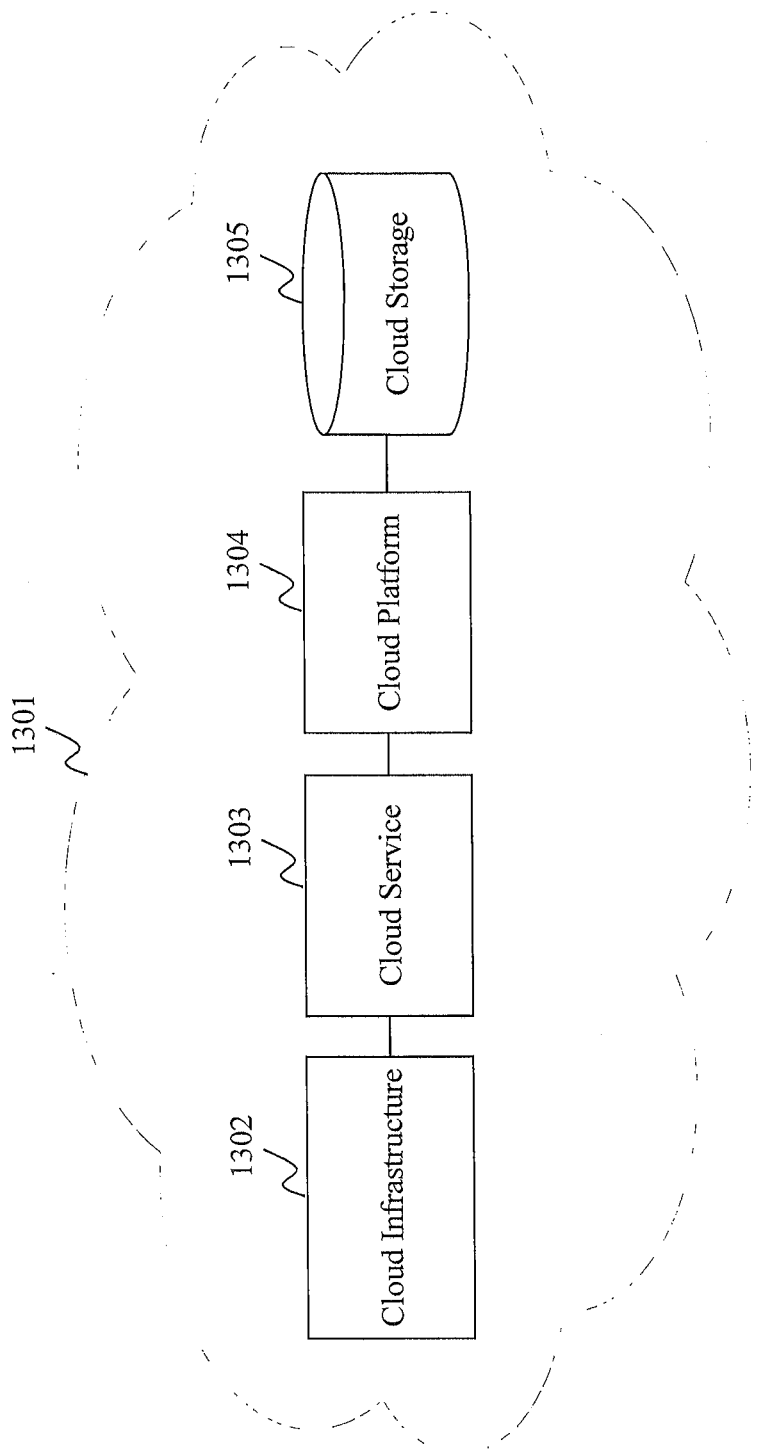
FIG. 13 depicts a general cloud computing architecture on which the present teaching can be implemented.

FIG. 13 depicts a general cloud computing architecture 1301 on which embodiments of present teaching may be implemented. The cloud computing architecture may include a Cloud Infrastructure 1302, a Cloud Service 1303, a Cloud Platform 1304, and Cloud Storage 1305. The cloud components may communicated with one another directly through a message queue or other coupling mechanism.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 14:
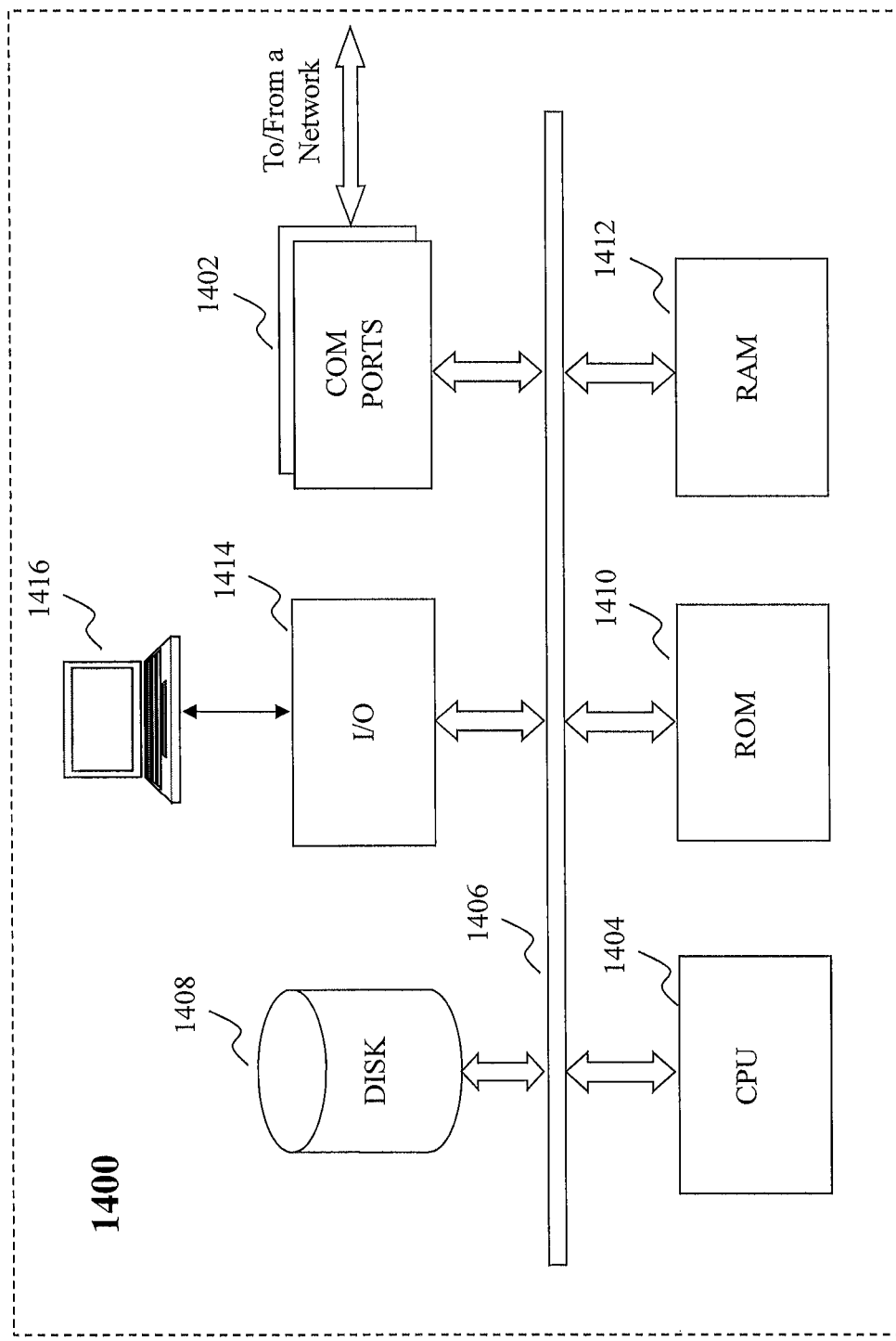
FIG. 14 depicts a general computer architecture on which the present teaching can be implemented.

FIG. 14 depicts a general computer architecture on which the present teaching can be implemented and has a functional block diagram illustration of a computer hardware platform that includes user interface elements. The computer may be a general-purpose computer or a special purpose computer. This computer 1400 can be used to implement any components of the user engagement measurement architecture as described herein. Different components of the system in the present teaching can all be implemented on one or more computers such as computer 1400, via its hardware, software program, firmware, or a combination thereof. Although only one such computer is shown, for convenience, the computer functions relating to the target metric identification may be implemented in a distributed fashion on a number of similar platforms, to distribute the processing load.

The computer 1400, for example, includes COM ports 1402 connected to and from a network connected thereto to facilitate data communications. The computer 1400 also includes a central processing unit (CPU) 1404, in the form of one or more processors, for executing program instructions. The exemplary computer platform includes an internal communication bus 1406, program storage and data storage of different forms, e.g., disk 1408, read only memory (ROM) 1410, or random access memory (RAM) 1412, for various data files to be processed and/or communicated by the computer, as well as possibly program instructions to be executed by the CPU. The computer 1400 also includes an I/O component 1414, supporting input/output flows between the computer and other components therein such as user interface elements 1416. The computer 1400 may also receive programming and data via network communications.

Hence, aspects of the methods of processing data using an iterative pipeline, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the search engine operator or other explanation generation service provider into the hardware platform(s) of a computing environment or other system implementing a computing environment or similar functionalities in connection with generating explanations based on user inquiries. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented in a software only solution—e.g., an installation on an existing server. In addition, the dynamic relation/event detector and its components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one computing device, each of which has at least one processor, storage, and a communication platform connected to a network for processing data, comprising:
   receiving, by the at least one processor, a record to be processed through a plurality of distributed processing stages;
   separating, by the at least one processor, the record into multiple partitions;
   determining, by the at least one processor, a number of map tasks to be performed on the multiple partitions based on a size of the record, wherein an output from each of the map tasks is a key-value pair, each of the map tasks is of a MapReduce programming model, and all values for a same key are reduced together;
   selecting, by the at least one processor, the plurality of distributed processing stages to process the multiple partitions;
   ordering, by the at least one processor, the plurality of distributed processing stages in a sequence based on functionalities of the distributed processing stages, the functionalities including the sequence of data enriching, data downloading, data uploading and storing, and post listings, wherein the data enriching includes enrichment of incremental data and a find location application programming interface; and
   submitting, each of the multiple partitions, by the at least one processor, to the sequenced distributed processing stages, wherein the multiple partition is sequentially processed by each of the sequenced distributed processing stages, and wherein different partitions transition through the sequenced distributed processing stages in a concurrent manner and wherein the partitions that have passed through each of the plurality of distributed processing stages are merged after all multiple partitions have been processed.

2. The method of claim 1, further comprising merging, by the at least one processor, the partitions that have passed through each of the plurality of distributed processing stages.

3. The method of claim 1, wherein the record is separated into multiple partitions based on capacity of a network application programming interface.

4. The method of claim 1, wherein the number of map tasks determines a request rate.

5. A system for processing data, comprising:
   at least one processor programmed to execute one or more computer program instructions which, when executed, cause the at least one processor to:
   receive a record to be processed through a plurality of distributed processing stages;
   separate the record into multiple partitions;
   determine a number of map tasks to be performed on the multiple partitions based on a size of the record, wherein an output from each of the map tasks is a key-value pair, each of the map tasks is of a MapReduce programming model, and all values for a same key are reduced together;

select the plurality of distributed processing stages to process the multiple partitions;

order the plurality of distributed processing stages in a sequence based on functionalities of the distributed processing stages, the functionalities including the sequence of data enriching, data downloading, data uploading and storing, and post listings, wherein the data enriching includes enrichment of incremental data and a find location application programming interface; and submit, each of the multiple partitions, by the at least one processor, to the sequenced distributed processing stages, wherein the multiple partition is sequentially processed by each of the sequenced distributed processing stages, and wherein different partitions transition through the sequenced distributed processing stages in a concurrent manner and wherein the partitions that have passed through each of the plurality of distributed processing stages are merged after all multiple partitions have been processed.

6. The system of claim 5, wherein the at least one processor is further caused to merge the partitions that have passed through each of the plurality of distributed processing stages.

7. The system of claim 5, wherein the record is separated into multiple partitions based on capacity of a network application programming interface.

8. A machine-readable tangible and non-transitory medium having information recorded thereon for processing data, wherein the information, when read by a machine, causes the machine to perform the following:

receiving, by the at least one processor, a record to be processed through a plurality of distributed processing stages;

separating, by the at least one processor, the record into multiple partitions;

determining, by the at least one processor, a number of map tasks to be performed on the multiple partitions based on a size of the record, wherein an output from each of the map tasks is a key-value pair, each of the map tasks is of a MapReduce programming model, and all values for a same key are reduced together;

selecting, by the at least one processor, the plurality of distributed processing stages to process the multiple partitions;

ordering, by the at least one processor, the plurality of distributed processing stages in a sequence based on functionalities of the distributed processing stages, the functionalities including the sequence of data enriching, data downloading, data uploading and storing, and post listings, wherein the data enriching includes enrichment of incremental data and a find location application programming interface; and submitting, each of the multiple partitions, by the at least one processor, to the sequenced distributed processing stages, wherein the multiple partition is sequentially processed by each of the sequenced distributed processing stages, and wherein different partitions transition through the sequenced distributed processing stages in a concurrent manner and wherein the partitions that have passed through each of the plurality of distributed processing stages are merged after all multiple partitions have been processed.

9. The medium of claim 8, wherein the record is separated into multiple partitions based on capacity of a network application programming interface.

10. The method of claim 1, wherein the post listings functionality of one of the distributed processing stages includes the listings being posted to a content grid entry point.

* * * * *